April 10, 1951     D. C. GILLESPIE     2,548,838
SNAP FASTENER
Filed Dec. 30, 1948

Inventor:
Daniel C. Gillespie
By Edward C. Fitzhaugh
Atty.

Patented Apr. 10, 1951

2,548,838

UNITED STATES PATENT OFFICE 2,548,838

SNAP FASTENER

Daniel C. Gillespie, Oak Park, Ill., assignor to Borg-Warner Corporation, Chicago, Ill., a corporation of Illinois Application December 30, 1948, Serial No. 68,191

8 Claims. (Cl. 24—213)

The present invention relates to snap fasteners and particularly to improvement in the one-piece scissors-type snap fasteners.

In snap fasteners of the scissors-type heretofore available, there has been incorporated an excessively high spring rate in the torsion links and a relatively small and ineffective lead or guide on the outer terminals of the legs with the result that it has been necessary in order to accomplish installation of these previously available fasteners to subject the same to a rather severe hammer blow. There has been an unsatisfactorily low percentage of acceptable installations and it is the primary object of this invention to correct these deficiencies and to provide a more satisfactory and acceptable snap fastener.

It is a more specific object to provide an improved fastener of the present type incorporating a relatively low rate spring action in the torsion links, having leg portions which diverge at an appreciable acute angle when in their normal relaxed position prior to installation, this being made feasible in part by the provision of a pair of lead-in feet of an improved form on the outer terminals of the legs.

It is another object to provide in a snap fastener of the above type an improved form and arrangement of a plurality of teeth on the outer edges of the legs, assuring the entry of the sheet metal periphery of the associated panel all or substantially all of the way to the base or root of the associated teeth, thus increasing the effectiveness of the fastener and preventing inadvertent release.

Still another object is the formation of the legs in the area opposite the teeth to present a minimum of overall width, to thus facilitate the entry of the legs into the minimum size of opening when the legs have been moved into the direction of alignment by the cooperation of the sole portions of the feet with periphery of the opening.

It is a further object to provide an improved method of stamping a snap fastener of the present type in one-piece from a sheet of spring metal so that when the torsion links are folded into intimate contact with the head or cup-like portion and the legs proper extend generally axially therefrom, the median lines of the legs will diverge at an acute angle and the inner edges along a portion of each leg and a portion of each foot will form a closed substantially rectilinear quadrilateral open area.

Finally, it is an object of the present invention to provide a snap fastener of the character generally outlined above which, when the fastener is in position within an opening, presents a pair of terminal foot portions which cross each other at a wide angle while remaining in contiguous relationship to provide a pair of intersecting wide angle surfaces or edges which, in effect, create a trough-like depression into which the end of a tool, as for example, a screw driver, may be placed whereupon, by the application of pressure to the snap fastener in an axial direction from the rear of a panel with which the snap fastener is associated, the angularity between the two legs of the snap fastener will be decreased and the legs brought into substantial parallelism so as to decrease the over-all width of the leg regions of the snap fastener and disengage the legs from the edges of the opening while at the same time forcing the entire snap fastener rearwardly and out of the opening. By such an arrangement, it is possible to completely remove the fastener from the panel or other structure in which it is installed without manually engaging the fastener, the edge of the screw driver or other tool employed for this purpose constituting the sole engaging means for effecting such removal of the fastener.

Other objects, advantages and uses of the present invention will become apparent from a reading of the following specification taken in connection with the appended drawings forming a part thereof and wherein.

Figure 1:
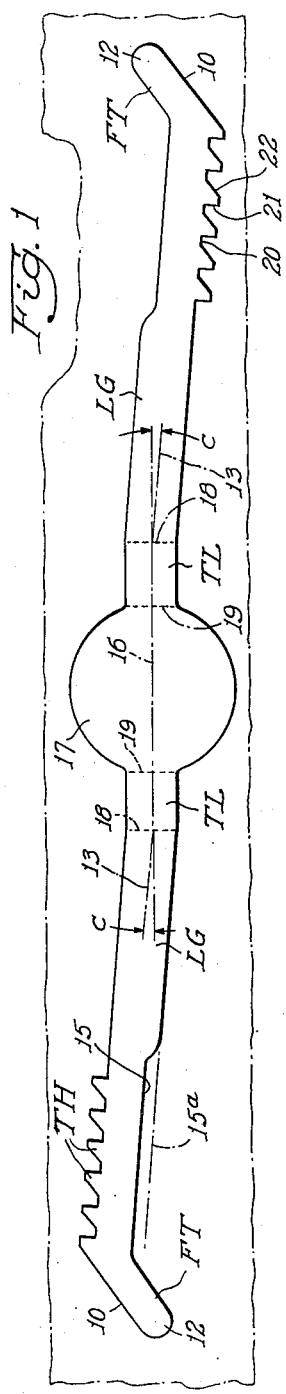
Fig. 1 is a plan view of the unitary or integral flat blank as stamped from a sheet of spring metal bringing out the initial angular disposition between the median lines of the torsion links or strips and the median lines of the legs proper.
Figure 2:
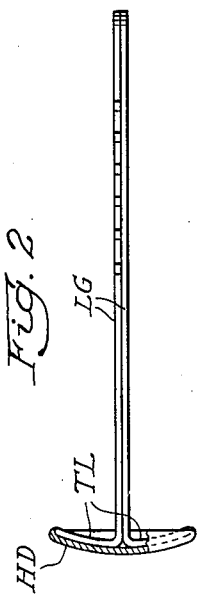
Fig. 2 is an edge view of the snap fastener after the torsion links have been folded into intimate relation with the inside of the disc portion and the same cupped to form the head of the snap fastener with the legs crossed and extending therefrom.

Referring in greater detail to the figures of the drawing, a one-piece snap fastener construction embodying the novel features of the present invention is indicated generally at SF and includes essentially a head HD, having protruding therefrom legs LG, the inner terminals of these legs being connected with the outer periphery of the head HD through torsion connecting strips or links TL and terminating at the outer extremity thereof in a pair of feet FT, the outer edges of the legs being formed with a plurality of teeth TH.

The present invention is directed particularly to the form, arrangement and function of feet FT; teeth TH; legs LG and torsion links TL.

Figure 4:
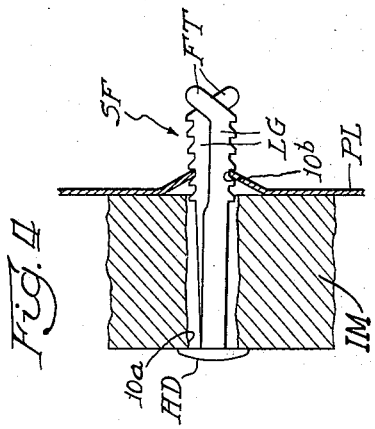
Fig. 4 is a sectional view through a representative panel installation showing a snap fastener in installed position.
Figure 3:
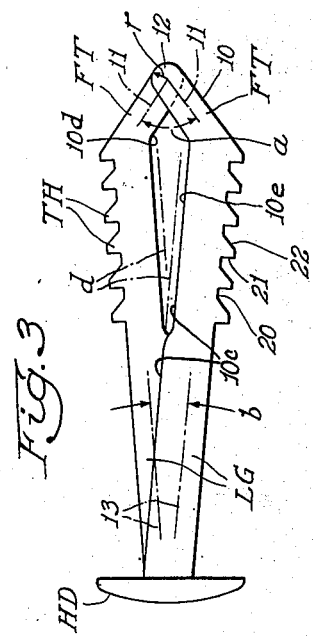
Fig. 3 is a view taken at right angles to that of Fig. 2 and showing the normal crossed relaxed position of the legs.

The snap fastener SF, as illustrated in Fig. 4, has primarily been designed for use in the fastening of a strip of sound-deadening or insulating material IM to a panel PL which may be the conventional dashboard of an automotive vehicle. Obviously, the snap fastener is capable of other uses and the same may be employed wherever it is found useful in the upholstery and other related arts.

Feet FT comprise soles 10 performing the dual function of guides or lead-in means to facilitate the introduction of the fastener into receiving openings 10a formed in the insulating or sound-deadening material IM, and openings 10b provided in the panel PL. The soles 10, when the fastener is installed within the openings 10a and 10b, provide means to facilitate the release of the fastener by the application of pressure to the soles for the purpose of disassembly all in a manner that will become clear presently. The feet FT are crossed inwardly and the median lines 11 subtend an acute angle a, the toes 12 normally lying in opposed relation in the relaxed condition of the fastener to thus define a collapsible wedge, facilitating initial introduction of the fastener into one of the receiving openings 10b. It is important to note that a considerable portion of the soles 10, as well as the toes 12 lie inwardly of the inner edges 10c of the legs LG and overlap in a pigeon-toed-like manner without actually crossing each other in the relaxed condition of the fastener, thus providing a much wider spread or open condition of the legs than has been possible with previous constructions. The angle a of convergence or intersection between median lines 11, which represents the angle of intersection between the soles 10, is substantially less than ninety degrees (90°) and may be of the order of sixty to eighty degrees (60° to 80°) preferably about seventy degrees (70°).

The radius r of toe 12 preferably is of a length equal to substantially one-half the width of the feet FT. The width of the feet FT is preferably only a fraction of the width of the legs LG, this being made feasible since the feet do not have to withstand a heavy impact as has been the case in earlier constructions.

The legs LG normally extend from the head HD in a scissors-like fashion, there being an appreciable acute angle b between the median lines 13. This angle b may be of the order of six to ten degrees (6° to 10°) made practicable by the provision of the above novel foot arrangement FT in the example illustrated, this angle being eight degrees (8°) as this has proven unusually effective. In other words, were it not for the function performed by the feet FT, it would be impracticable to spread the outer portions of the legs LG to a point beyond actual overlap of the inner edges of the legs. With the present arrangement, it will be observed that the outwardly diverging inner edges 10c of the legs and the inwardly converging edges 10d of the feet completely enclose an appreciable linear quadrilateral open space therewithin.

This additional spread or larger angle b than has been practicable in arrangements heretofore available makes possible an additional feature of importance namely the incorporation in torsion link TL and connecting structure, of a relatively soft spring action or low spring rate. This softer spring action or low rate greatly facilitates the installation of the snap fastener into an associated opening as well as the removal therefrom and eliminates the necessity for a sharp and often destructive hammer blow in accomplishing the installation. With the present construction of snap fastener, the same may be readily installed by the use of a pressure no greater than that which a worker is able to comfortably exert with his finger against head HD.

This softer spring action or low rate spring is tied in closely with the method of forming the structure. This method of fabrication includes the stamping or striking of the blank in one integral piece from a sheet of spring metal, the blank being particularly characterized by the median line 16 of the torsion link TL lying on a diameter of the disc portion 17 while the median line 13 of the legs LG extend at a small acute angle c with reference thereto, this angle being of the order of three to five degrees (3° to 5°) preferably about four degrees (4°) in the chosen embodiment. This has proven particularly effective where the legs have a length of the order of two inches. This angle may be varied slightly with different lengths of legs LG. Subsequent to striking the blank the legs LG are folded about dotted line 18 and torsion links TL are folded about dotted line 19 both lines being parallel and the latter being substantially tangential to the periphery of disc 17. Torsion link TL is pressed into intimate relationship with the surface of disc 17 and the assembly formed to provide an overall cup-shaped head HD. The folding along line 18 results in the legs LG being automatically crossed with the median lines 13 thereof disposed at an angle which is the sum of the two angles of divergence between median lines 13 and 16 or in the example chosen this angle will be of the order of eight degrees (8°) or twice angle c.

Particular importance is attributed to this method of effecting the normal crossing of the legs at an appreciable angle. In previous arrangements the small angle b present, was accomplished by striking the blank with the legs and torsion links lying with their median lines coinciding and subsequently permanently distorting or permanently twisting the legs about their point of juncture with the torsion links to give a slight amount of crossing. Such an arrangement has two defects including; (1) the limitation upon the practical extent of the spread or crossing of the legs; and (2) less flexibility or a resulting higher rate of spring action. In the present arrangement by striking the blank as disclosed with the median lines of the legs and of the torsion links disposed at a small acute angle and folding about the lines 18 and 19, as well as by pressing the torsion links TL into intimate contact with the inner cupped periphery of the head HD, there results a much softer and lower rate spring action. This spring action can of course be still further softened or the rate thereof decreased by reducing the overall width of the torsion links TL in relation to the length thereof, within practical limits, it being more feasible to do this where the torsion links TL are intimately nested into contact with the inner periphery of the head HD.

As pointed out above the blank is struck with the feet FT extending in opposite direction beyond the side or edge of the legs with the result that when the legs LG and the torsion links TL are folded into their normal relation the feet FT have the toe portions 12 thereof in matched or opposed relation forming a wedge-like entering means or guide, for facilitating installation and further performing the function of providing means for facilitating the disassembly thereof from installed position by the application of pressure to the feet.

The teeth TH are given an improved form and arrangement including the provision of an appreciable flat or dwell 20 at the roots thereof. This dwell portion 20 may have a length of the order of from .040 inch to .002 inch which is sufficient for the entry into contact therewith of the surrounding wall defining opening in the average automotive panel stock PL. The locking surfaces 21 of the teeth preferably extend transversely to the direction of the median lines 13 of the legs while the opposed surfaces 22 of the teeth are inclined thereto.

It is further important to note that each leg LG is recessed on the opposite edge thereof from the teeth to provide elongated offset portions 10e thus still further improving the readiness with which the legs can be introduced into a particular size opening and as a matter of fact reducing the minimum dimension of the opening in which the same may be installed. The inner edges of the legs in the area of the teeth would occupy the position indicated by dotted line $d$, were the same not recessed as at 10e.

While the present invention has been disclosed in connection with a specific embodiment thereof, it will be understood that other equivalent applications thereof may be made and it is intended that the same be defined by the appended claims which should be given a scope commensurate with the prior art.

What is claimed is:

1. An integral spring sheet metal snap fastener formed from a single sheet of flat metal stock and having a cup-shaped head portion, a pair of torsion strips or links of less width than the diameter of said head portion extending radially inwardly from opposite edges of said head portion in closely nested relation to the inner surface of the head, said torsion links merging into contiguous relationship adjacent a diametrical plane extending through the head and being extended in the form of relatively long flat legs, each of which extends generally away from said head in an axial direction in scissors-like fashion in the normal relaxed condition of the fastener, the median lines of said legs being disposed at an acute angle with respect to each other, a relatively short terminal foot portion formed on the free end of each leg, said foot portions overlapping each other in contiguous relationship and each foot extending at an obtuse angle from the leg portion on which it is formed, the inner edges of said legs and of said foot portions surrounding an appreciable open space and forming therebetween a rectilinear trapezoidal figure, and a series of teeth on the outer edges of said legs adapted to engage the inner peripheral edge of an opening defined in a panel when the fastener is in position with respect to the panel, the outer edges or sole portions of said foot portions forming guides for facilitating the introduction of said legs into said opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

2. An integral spring sheet metal snap fastener formed from a single sheet of flat metal stock and having a cup-shaped head portion, a pair of torsion strips of links of less width than the diameter of said head portion extending radially inwardly from opposite edges of said head portion in closely nested relation to the inner surface of the head, said torsion links merging into contiguous relationship adjacent a diametrical plane extending through the head and being extended in the form of relatively long flat legs, each of which extends generally away from said head in an axial direction in scissors-like fashion in the normal relaxed condition of the fastener, the median lines of said legs being disposed at an acute angle with respect to each other, a relatively short terminal foot portion formed on the free end of each leg, said foot portions overlapping each other in contiguous relationship and each foot extending at an obtuse angle from the leg portion on which it is formed, the inner edges of said legs and of said foot portions surrounding an appreciable open space and forming therebetween a rectilinear trapezoidal figure, and a series of teeth on the outer edges of said legs adapted to engage the inner peripheral edge of an opening defined in a panel when the fastener is in position with respect to the panel, adjacent teeth on each leg being separated by an intervening generally axially extending flat or dwell surface effective to assure complete entry of the edges of said opening between the teeth to points adjacent the roots of said teeth, the outer edges or sole portions of said foot portions forming guides for facilitating the introduction of said legs into said opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

3. An integral spring sheet metal snap fastener formed from a single sheet of flat metal stock and having a cup-shaped head portion, a pair of torsion strips or links of less width than the diameter of said head portion extending radially inwardly from opposite edges of said head portion in closely nested relation to the inner surface of the head, said torsion links merging into contiguous relationship adjacent a diametrical plane extending through the head and being extended in the form of relatively long flat legs, each of which extends generally away from said head in an axial direction in scissors-like fashion in the normal relaxed condition of the fastener, the median lines of said legs being disposed at an acute angle with respect to each other, a relatively short terminal foot portion formed on the free end of each leg, said foot portions overlapping each other in contiguous relationship and each foot extending at an obtuse angle from the leg portion on which it is formed, the inner edges of said legs and of said foot portions surrounding an appreciable open space and forming therebetween a rectilinear trapezoidal figure, and a series of teeth on the outer edges of said legs adapted to engage the inner peripheral edge of an opening defined in a panel when the fastener is in position with respect to the panel, adjacent teeth on each leg being separated by an intervening generally axially extending flat or dwell surface effective to assure complete entry of the edges of said opening between the teeth to points adjacent the roots of said teeth, the sides of said teeth nearest said head portion extending substantially perpendicular to the medial axis of the respective leg portions on which the teeth are formed, the outer edges or sole portions of said foot portions forming guides for facilitating the introduction of said legs into said opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

4. An integral spring sheet metal snap fastener formed from a single sheet of flat metal stock and having a cup-shaped head portion, a pair of torsion strips or links of less width than the diameter of said head portion extending radially inwardly from opposite edges of said head portion in closely nested relation to the inner surface of the head, said torsion links merging into contiguous relationship adjacent a diametrical plane extending through the head and being extended in the form of relatively long flat legs, each of which extends generally away from said head in an axial direction in scissors-like fashion in the normal relaxed condition of the fastener, the median lines of said legs being disposed at an acute angle with respect to each other, a relatively short terminal foot portion formed on the free end of each leg, said foot portions overlapping each other in contiguous relationship and each foot extending at an obtuse angle from the leg portion on which it is formed, the inner opposed edges of said legs in the outer regions thereof between said foot portions and head being provided with a shallow recess, the inner edges of said recesses and of said foot portions surrounding an appreciable open space and forming therebetween a rectilinear trapezoidal figure, and a series of teeth on the outer edges of said legs adapted to engage the inner peripheral edge of an opening defined in a panel when the fastener is in position with respect to the panel, the outer edges or sole portions of said foot portions forming guides for facilitating the introduction of said legs into said opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

5. An integral spring sheet metal snap fastener formed from a single sheet of flat metal stock and having a cup-shaped head portion, a pair of torsion strips or links of less width than the diameter of said head portion extending radially inwardly from opposite edges of said head portion in closely nested relation to the inner surface of the head, said torsion links merging into contiguous relationship adjacent a diametrical plane extending through the head and being extended in the form of relatively long flat legs, each of which extends generally away from said head in an axial direction in scissors-like fashion in the normal relaxed condition of the fastener, the median lines of said legs being disposed at an acute angle with respect to each other, a relatively short terminal foot portion formed on the free end of each leg, said foot portions overlapping each other in contiguous relationship and each foot extending at an obtuse angle from the leg portion on which it is formed, the inner opposed edges of said legs in the outer regions thereof between said foot portions and head being provided with a shallow recess, the inner edges of said legs and of said foot portions surrounding an appreciable open space and forming therebetween a rectilinear trapezoidal figure, and a series of teeth on the outer edges of said legs adapted to engage the inner peripheral edge of an opening defined in a panel when the fastener is in position with respect to the panel, adjacent teeth on each leg being separated by an intervening generally axially extending flat or dwell surface effective to assure complete entry of the edges of said opening between the teeth to points adjacent the roots of said teeth, the outer edges or sole portions of said foot portions forming guides for facilitating the introduction of said legs into said opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

6. An integral spring sheet metal snap fastener formed from a single sheet of flat metal stock and having a cup-shaped head portion, a pair of torsion strips or links of less width than the diameter of said head portion extending radially inwardly from opposite edges of said head portion in closely nested relation to the inner surface of the head, said torsion links merging into contiguous relationship adjacent a diametrical plane extending through the head and being extended in the form of relatively long flat legs, each of which extends generally away from said head in an axial direction in scissors-like fashion in the normal relaxed condition of the fastener, the median lines of said legs being disposed at an acute angle with respect to each other, a relatively short terminal foot portion formed on the free end of each leg, said foot portions overlapping each other in contiguous relationship and each foot extending at an obtuse angle from the leg portion on which it is formed, the inner opposed edges of said legs in the outer regions thereof between said foot portions and head being provided with a shallow recess, the inner edges of said legs and of said foot portions surrounding an appreciable open space and forming therebetween a rectilinear trapezoidal figure, and a series of teeth on the outer edges of said legs adapted to engage the inner peripheral edge of an opening defined in a panel when the fastener is in position with respect to the panel, adjacent teeth on each leg being separated by an intervening generally axially extending flat or dwell surface effective to assure complete entry of the edges of said opening between the teeth to points adjacent the roots of said teeth, the sides of said teeth nearest said head portion extending substantially perpendicular to the medial axis of the respective leg portions on which the teeth are formed, the outer edges or sole portions of said foot portions forming guides for facilitating the introduction of said legs into said opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

7. An integral spring sheet metal fastener formed from a single sheet of flat metal stock and having a head portion, a pair of torsion strips or legs extending inwardly from opposite edges of said head portion in closely nested relation to the inner surface of the head, said torsion links merging into contiguous relationship adjacent the medial region of said head portion and being extended in the form of flat legs, each of which extends generally away from said head portion perpendicularly in scissors-like fashion in the normal relaxed condition of the fastener, the median lines of said legs being disposed at an acute angle with respect to each other, and a terminal foot portion formed on the free end of each leg, said foot portions overlapping each other in contiguous relationship and each foot portion extending at an obtuse angle from the leg portion on which it is formed, the inner edges of said legs and of said foot portions surrounding an appreciable open space and forming therebetween a rectilinear trapezoidal figure, the outer edges or sole portions of said foot portions forming guides for facilitating the introduction of said legs into an opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

8. An integral spring sheet metal fastener formed from a single sheet of flat metal stock and having a head portion, a pair of torsion strips or legs extending inwardly from opposite edges of said head portion in closely nested relation to the inner surface of the head, said torsion links merging into contiguous relationship adjacent the medial region of said head portion and being extended in the form of flat legs, each of which extends generally away from said head portion perpendicularly in scissors-like fashion in the normal relaxed condition of the fastener, the median lines of said legs being disposed at an acute angle with respect to each other, a terminal foot portion formed on the free end of each leg, said foot portions overlapping each other in contiguous relationship and each foot portion extending at an obtuse angle from the leg portion on which it is formed, the inner edges of said legs and of said foot portions surrounding an appreciable open space and forming therebetween a rectilinear trapezodial figure, and a series of teeth on the outer edges of said legs adapted to engage the inner peripheral edge of an opening defined in a panel when the fastener is in position with respect to the panel, the outer edges or sole portions of said foot portions forming guides for facilitating the introduction of said legs into the opening, said foot portions being adapted to intersect each other in crossing relationship when the fastener is in position in the opening and on the panel to provide a trough-like depression adapted for reception of the end of a tool whereby upon pressure being applied by said tool to said fastener in an axial direction, the relative angularity between said foot portions will increase and the relative angularity between said leg portions will decrease to thereby cause the fastener to shrink in over-all width and facilitate release of the same from the opening in which it is mounted.

DANIEL C. GILLESPIE.

REFERENCES CITED

The following references are of record in the file of this patent:

UNITED STATES PATENTS

| Number | Name | Date |
| --- | --- | --- |
| 2,048,659 | Jones | July 21, 1936 |
| 2,077,355 | Chaffee | Apr. 13, 1937 |
| 2,126,482 | Lombard | Aug. 9, 1938 |
| 2,144,882 | Johnson | Jan. 24, 1939 |